United States Patent
Day

(10) Patent No.: US 7,260,846 B2
(45) Date of Patent: *Aug. 21, 2007

(54) INTRUSION DETECTION SYSTEM

(75) Inventor: Christopher W. Day, Biscayne Park, FL (US)

(73) Assignee: Steelcloud, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/367,950

(22) Filed: Mar. 3, 2006

(65) Prior Publication Data

US 2006/0156404 A1   Jul. 13, 2006

(51) Int. Cl.
*G06F 11/00* (2006.01)

(52) U.S. Cl. .................... 726/23; 726/11; 726/13; 726/14; 726/25; 726/27; 713/194; 709/223

(58) Field of Classification Search ............... 726/23, 726/11, 13–14, 25, 27; 713/194; 709/223
See application file for complete search history.

(56) References Cited

U.S. PATENT DOCUMENTS

| | | | |
|---|---|---|---|
| 5,278,901 A | 1/1994 | Shieh et al. .................... 380/4 |
| 5,311,593 A | 5/1994 | Carmi ......................... 380/23 |
| 5,414,833 A | 5/1995 | Hershey et al. ............. 395/575 |

(Continued)

FOREIGN PATENT DOCUMENTS

EP   0 985 995   3/2000

(Continued)

OTHER PUBLICATIONS

Roesch, Snort—Lightweight Intrusion Detection for Networks, 1999, Usenix, pp. 1-2.*

(Continued)

*Primary Examiner*—Kim Vu
*Assistant Examiner*—Paula Klimach
(74) *Attorney, Agent, or Firm*—Steven M. Greenberg, Esq.

(57) ABSTRACT

An intrusion detection system (IDS). An IDS which has been configured in accordance with the present invention can include a traffic sniffer for extracting network packets from passing network traffic; a traffic parser configured to extract individual data from defined packet fields of the network packets; and, a traffic logger configured to store individual packet fields of the network packets in a database. A vector builder can be configured to generate multi-dimensional vectors from selected features of the stored packet fields. Notably, at least one self-organizing clustering module can be configured to process the multi-dimensional vectors to produce a self-organized map of clusters. Subsequently, an anomaly detector can detect anomalous correlations between individual ones of the clusters in the self-organized map based upon at least one configurable correlation metric. Finally, a classifier can classify detected anomalous correlations as one of an alarm and normal behavior.

12 Claims, 4 Drawing Sheets

U.S. PATENT DOCUMENTS

| | | | |
|---|---|---|---|
| 5,526,299 | A | 6/1996 | Coifman et al. ............ 364/807 |
| 5,621,889 | A | 4/1997 | Lermuzeaux et al. ....... 395/186 |
| 5,692,124 | A | 11/1997 | Holden et al. .......... 395/187.01 |
| 5,787,253 | A | 7/1998 | McCreery et al. ..... 395/200.61 |
| 5,835,726 | A | 11/1998 | Shwed et al. .......... 395/200.59 |
| 5,850,386 | A | 12/1998 | Anderson et al. ........... 370/241 |
| 5,918,223 | A | 6/1999 | Blum et al. ..................... 707/1 |
| 5,968,176 | A | 10/1999 | Nessett et al. .............. 713/201 |
| 5,991,881 | A | 11/1999 | Conklin et al. ............. 713/201 |
| 6,026,442 | A | 2/2000 | Lewis et al. ................ 709/229 |
| 6,044,401 | A | 3/2000 | Harvey ....................... 709/225 |
| 6,088,804 | A | 7/2000 | Hill et al. ................... 713/201 |
| 6,115,393 | A | 9/2000 | Engel et al. ................ 370/469 |
| 6,134,664 | A | 10/2000 | Walker ....................... 713/291 |
| 6,263,444 | B1 | 7/2001 | Fujita ......................... 713/201 |
| 6,279,113 | B1 | 8/2001 | Vaidya ....................... 713/201 |
| 6,282,546 | B1 | 8/2001 | Gleichauf et al. .......... 707/102 |
| 6,301,668 | B1 | 10/2001 | Gleichauf et al. .......... 713/201 |
| 6,304,262 | B1 | 10/2001 | Maloney et al. ............ 345/418 |
| 6,304,904 | B1 | 10/2001 | Sathyanarayan et al. .... 709/224 |
| 6,321,338 | B1 | 11/2001 | Porras et al. ............... 713/201 |
| 6,327,550 | B1 | 12/2001 | Vinberg et al. ............. 702/186 |
| 2002/0032880 | A1 | 3/2002 | Poletto et al. .................. 714/4 |
| 2002/0035683 | A1 | 3/2002 | Kaashoek et al. .......... 713/154 |

FOREIGN PATENT DOCUMENTS

| | | |
|---|---|---|
| WO | WO 00/34847 | 6/2000 |

OTHER PUBLICATIONS

G. Bigna, et al., NetSTAT: A Network-based Intrusion Detection Approach, *Proc. of the 14th Annual Computer Security Application Conf.*, Scottsdale, AZ, (Dec. 1998).

C. Prosise, et al., *Catch Hackers in the Act*, <http://builder.cnet.com/webbuilding/0-7532-8-4011019-4.html>, (Dec. 13, 2000).

*The Science of Intrusion Detection System Attack Identification*, Cisco Systems, Inc., (2002).

C. Gerg, A Platform-Independent Discussion of Network Security, *Information Security Bulletin*, pp. 29-33, (May 2001).

A. Allan, Intrusion Detection Systems (IDSs): Perspective, *Gartner*, (Jan. 4, 2002).

*Snort Overview*, <http://www.snort.org/docs/writing_rules.chap1.html>, (Jul. 15, 2002).

W. Simonds, *Bad Packets: Snort—The Dobermans Behind the Firewall*, searchNetworking.com, (Feb. 28, 2002).

Roundtable—IDS At the Crossroads, *Information Security Magazine*, (Jun. 2002).

E. Duggan, Hackers Warn of 'Crackers', *The South Florida Business Journal*, (Jul. 5-11, 2002).

\* cited by examiner

INTRUSION DETECTION SYSTEM

BACKGROUND OF THE INVENTION

1. Statement of the Technical Field

The present invention relates to computer communications network security and performance monitoring and more particularly to an intrusion detection system.

2. Description of the Related Art

Internet security has increasingly become the focus of both corporate and home computer users who participate in globally accessible computer networks. In particular, with the availability of broadband Internet access, even within smaller computer communication networks, most network attached computing devices enjoy continuous access to the Internet. Notwithstanding, continuous, high-speed access is not without its price. Specifically, those computers and computer networks which heretofore had remained disconnected from the security risks of the Internet now have become the primary target of malicious Internet hackers, crackers and script kiddies (relatively unskilled hackers), collectively referred to herein as "unauthorized intruders".

Notably, many such unauthorized intruders continuously scan the Internet for Internet Protocol (IP) addresses and ports of vulnerable computers communicatively linked to the Internet. At the minimum, those vulnerable computers can experience nuisance damage such as accessed, deleted or modified files or defaced Web pages. Yet, at the other extreme, for the unsuspecting end-user, their computer can become the launching pad for more malicious attacks which can cripple whole segments of the Internet.

To combat the enhanced threat of unauthorized intruders, information technologists have liberally deployed firewall technology about the enterprise, at least to limit the source and channel of packet flow to and from the enterprise. Still, while firewall usage can limit the number of ports through which an unauthorized intruder can access an internal portion of a network, the firewall in of itself can be comprised by an unauthorized intruder. Popular examples include denial of service attacks and SYN flood attacks. Thus, while firewall usage can improve the security of a network, deploying firewall technology alone cannot completely secure the network.

To fill the security gap left open by firewall usage, information technologists incorporate intrusion detection system (IDS) technology within the enterprise. IDS technology can detect network intrusions dynamically as they occur or post-mortem after the intrusion has occurred. A typical dynamic network IDS, for instance the IDS disclosed in United States Patent Application Publication No. 2002/0035683 A1 to Kaashoek et al. for ARCHITECTURE TO THWART DENIAL OF SERVICE ATTACKS, can include a monitoring component able to capture network packets as the packets pass through the IDS, an inference component for determining whether the captured traffic indicates any malicious activity or usage, and a response component able to react appropriately to the detection of a malicious intrusion. While the response can include the generation and transmission of a simple e-mail message to a system administrator, the response also can include more complex actions, for instance temporarily blocking traffic flowing from an offenders Internet protocol (IP) address.

Conventional IDS technology can incorporate a variety of methodologies for determining within the inference component whether malicious activity has occurred or is occurring. Referred to as "detection methodologies", examples can include simple pattern matching, stateful pattern matching, protocol decode-based signatures, heuristic-based signatures, and anomaly detection. Pattern matching is based upon inspecting traffic to identify a fixed sequence of bytes in a single packet. The fixed sequence of bytes, referred to in the art as a "signature", when identified within inspected traffic, can trigger an alarm. U.S. Pat. No. 6,279,113 B1 to Vaidya for DYNAMIC SIGNATURE INSPECTION-BASED NETWORK INTRUSION DETECTION illustrates an exemplary use of pattern matching technology.

Still, pattern matching is considered to be the most primitive of the detection methodologies employed in a typical IDS. In that regard, pattern matching can fail where the hack attack differs only slightly from the stored signatures leading to what is known as "false negatives"—the failure to detect an attack after having inspecting traffic associated with an attack. Stateful pattern matching is an enhanced, more mature version of simple pattern matching based upon the notion that a stream of network traffic includes more than mere stand-alone packets. In consequence, pattern matching ought to be applied in the context of a stream of packets. To place pattern matching within the context of a stream of packets, the stateful pattern matching methodology considers the arrival order of packets in a stream and applies pattern matching to packets in the stream. Still, like simple pattern matching, stateful pattern matching can fail where the pattern of an attack differs only slightly from the stored signatures, again leading to false negatives.

Protocol decode-based analysis has been considered to be an intelligent extension to stateful pattern matching. In protocol decode-based analysis, traffic first is decoded in real-time according to a specified protocol such as HTTP in order to identify the pertinent fields of the protocol. Once the fields of the traffic specified by the protocol have been decoded, pattern matching can be applied to the decoded fields. U.S. Pat. No. 6,301,668 B1 to Gleichauf et al. for METHOD AND SYSTEM FOR ADAPTIVE NETWORK SECURITY USING NETWORK VULNERABILITY ASSESSMENT illustrates one such application of a protocol decode-based analysis.

As will be apparent from a review of the '668 system, the protocol decode-based analysis can limit the number of false alarms, or "false positives", encountered during the matching process because much of the matched elements are placed into context through the decoding process. Still, the false positive rate of the protocol decode-based analysis is largely dependent on the accuracy of the publicly-specified protocol definition. Also, the success of the protocol decode-based analysis relies directly upon the freshness of the patterns used to identify unauthorized intrusions.

Unlike intrusion detection techniques which rely directly upon pattern matching, a heuristic-based analysis employs algorithmic logic upon which intrusion detection signatures can be based. Typically, the algorithmic logic can analyze traffic patterns in order to match a particular traffic pattern with a known "signature". For instance, the probing of a network device can be detected where many unique ports are accessed over a limited period of time. Moreover, the type of packets touching the unique ports further can indicate whether an unauthorized intrusion is unfolding. Of course, any heuristic-based analysis can report false positives where a pattern of legitimate access to a network device satisfies the algorithmic logic. Hence, the use of a heuristic-based analysis requires extensive and frequent tuning to limit such false positives.

Similar to the heuristic-based analysis, in an anomaly-based analysis, traffic can be dynamically inspected as the traffic passes through the IDS. In an anomaly-based analysis, however, traffic patterns can be analyzed to detect anomalous behavior. Specifically, in an anomaly-based analysis, first a normal state is defined. Subsequently, traffic patterns which deviate from the normal state are labeled as unauthorized intrusions. Notably, though some anomaly-based analysis are configured to adapt the definition of normal state to traffic patterns as they unfold, none have been able to properly avoid the classification of some abnormal behavior as normal behavior. Moreover, no one conventional anomaly-based analysis has been able to distinguish anomalous behavior from permissible deviations from the normal state.

Nevertheless, IDS technology heretofore has been unable to provide a comprehensive method for detecting unauthorized intrusions while minimizing false positives. Specifically, static methods of detection such as pattern matching and its derivatives standing alone can be defeated by a sophisticated intruder with relative ease. Likewise, dynamic methods of detection such as those based upon heuristics and anomaly detection are limited to the extent that the methods can be configured improperly or ineffectively.

In addressing the deficiencies of the foregoing IDS methodologies, several IDS technologies incorporate a hybrid combination of static signature based pattern matching algorithms and dynamic anomaly detection algorithms. As an example, U.S. Pat. No. 6,321,338 to Porras et al. for NETWORK SURVEILLANCE discloses a method of network surveillance in which one or more analysis engines can perform both signature analysis and a statistical profiling of recorded network events. As discussed in column 4, lines 61 through 67 of the '338 specification, the event stream can be derived from a variety of sources, specifically the payload of a TCP/IP network packet or data contained in an analysis report.

Nevertheless, in view of the substantial processing resources required to reduce network traffic flowing across multiple network nodes, the '338 system processes only "events" detected and disseminated by a group of distributed monitoring components. That is to say, the '338 system does not process all network traffic flowing through the IDS with which the traffic can be analyzed to identify an unauthorized intrusion. Instead, the '338 system performs a tiered analysis of suspicious events in order to reduce the resource overhead which otherwise would be associated with a more thorough analysis.

More importantly, as the '338 system undertakes a fundamental analysis only of "event data" as stated in column 5, lines 34-35, the '338 system does not analyze traffic at a granular enough level to apply sophisticated statistical analyses. In particular, in the field of network analysis it is known to extract data from each individual packet field in a network packet in order to troubleshoot traffic flow in a network. U.S. Pat. No. 5,787,253 to McCreery et al. for APPARATUS AND METHOD OF ANALYZING INTERNET ACTIVITY describes such a device. Yet, in conventional IDS technology such as that described in the '338 system, the individual fields of a network traffic packet are never analyzed. In fact, in the '338 system, only the payload of an errant packet is extracted for analysis.

Ideally, to undertake the effective statistical analysis which is required to minimize false positives in the application of an anomaly based detection scheme, a maximum amount of data samples of exceptional granularity will be required. Thus, in the context of an IDS, it would be preferable to analyze each packet flowing across the IDS. Yet, to process each packet in-line would require an unreasonable share of processing resources. Moreover, to process each packet in batch would require substantial fixed storage and an unusually thorough analysis scheme not available through ordinary anomaly based detection schemes.

As an example, the IDS taught in U.S. Pat. No. 6,282,546 to Gleichauf et al. for SYSTEM AND METHOD FOR REAL-TIME INSERTION OF DATA INTO A MULTI-DIMENSIONAL DATABASE FOR NETWORK INSTRUCTION DETECTION AND VULNERABILITY ASSESSMENT employs the batch processing of real-time acquired data to detect an unauthorized intrusion. Yet, the '546 system performs a limited analysis only upon a limited set of scalar meta-data such as time, address space, and event type. Moreover, the '546 system performs an analysis only upon a limited subset of all traffic passing through the IDS—namely data already associated with an event such as an attack. The '546 system, then, does not analyze any volume of network traffic prior to the detection of an event. Thus, the '546 system like other conventional IDS implementations, cannot achieve a high level of intrusion detection while minimizing false positives.

SUMMARY OF THE INVENTION

The present invention is an IDS which overcomes the limitations of conventional IDS technology. Specifically, in the present invention, the IDS can monitor and packets passing across a coupled communications path. The IDS can identify protocol boundaries separating the various fields of each passing network packet and can store data for selected ones or all of the fields in a database, such as a relational database. In particular, data for each field can be stored in a separate record to facilitate the robust analysis of the stored data at a substantially granular level.

Once sufficient data has be stored in the database, multi-dimensional vectors can be constructed and reduced from the stored data. The reduced multi-dimensional vectors can be processed using one or more conventional multi-variate analysis methods and the output sets produced by the multi-variate analysis methods can be correlated against one another according to one or more selected metrics. Based upon these correlations, both normal and anomalous events can be identified.

An IDS which has been configured in accordance with the present invention can include a traffic sniffer for extracting network packets from passing network traffic; a traffic parser configured to extract individual data from defined packet fields of the network packets; and, a traffic logger configured to store individual packet fields of the network packets in a database. A vector builder can be configured to generate multi-dimensional vectors from selected features of the stored packet fields.

Notably, at least one self-organizing clustering module can be configured to process the multi-dimensional vectors to produce a self-organized map of clusters. Subsequently, an anomaly detector can detect anomalous correlations between individual ones of the clusters in the self-organized map based upon at least one configurable correlation metric. Finally, a classifier can classify detected anomalous correlations as either an alarm or normal behavior.

In one aspect of the present invention, the self-organizing clustering module can be configured to perform at least one of a Kohenen self-organizing map analysis, a principal component analysis, an multi-dimensional scaling analysis, a principal curve analysis, a wavelet analysis, and a neural network analysis. Also, the correlation metric can be configured either heuristically or manually. For example, the correlation metric can be a distance metric selected from the group consisting of a Euclidean distance metric and a non-Euclidean distance metric. Finally, the classifier can be configured to weight individual ones of the anomalous correlations according to a corresponding self-organizing clustering module used to produce particular clusters between which the individual ones of the anomalous correlations are detected.

An intrusion detection method also can be provided in accordance with the inventive arrangements. The method can include the steps of monitoring network traffic passing across a network communications path; extracting network packets from the passing traffic; and, storing individual components of the network packets in a database. Multi-dimensional vectors can be constructed from at least two of the stored individual components and at least one multi-variate analysis can be applied to the constructed multi-dimensional vectors. In consequence, the multi-variate analysis can produce a corresponding output set;

A correlation can be established between individual output sets based upon a selected metric to identify anomalous behavior. As such, the anomalous behavior can be classified as one of a network fault and a network attack. Importantly, the storing step can include both identifying protocol boundaries in each extracted network packet; and, storing data from each field separated by the identified protocol boundaries in a separate record in the database. Moreover, with each individual component in the separate record in the database, data can be stored which associates the individual component with at least one of a corresponding target network device, a corresponding network socket, and a corresponding customer in a managed service provider environment.

The step of applying at least one multi-variate analysis to the constructed multi-dimensional vectors can include both reducing the constructed multi-dimensional vectors; and, applying at least one self-organizing clustering methodology to the reduced multi-dimensional vectors. In that regard, the application of the at least one self-organizing clustering methodology can produce a corresponding output set of clusters. In consequence, in the establishing step at least one selectable metric can be loaded and individual ones of the clusters in the output set can be correlated. It can be determined whether any of the correlations deviate from the loaded at least one selectable metric. Finally, for each one of the correlated clusters in the output set which deviates from the loaded at least one selectable metric, the deviating correlated cluster can be labeled as exhibiting anomalous behavior.

Importantly, the IDS of the present invention can be disposed according to a managed service provider model. In that regard, the IDS can be coupled to multiple communications paths leading to separate network domains belonging to or managed by separate customers. In this regard, the intrusion detection method of the present invention can include monitoring network traffic passing across a network communications path destined for multiple target devices in multiple independent network domains and extracting network packets from the passing traffic.

Protocol boundaries can be identified in each extracted network packet and data from each field separated by the identified protocol boundaries can be stored in a separate record in a database. The data in the database can be associated with at least one of a corresponding target device, a target network domain, a target customer, and a target customer sub-net. Subsequently, the stored data can be processed using at least one multi-variate clustering method to establish correlations between fields of different network packets destined for different ones of the multiple independent network domains. Finally, a network attack can be identified based upon the established correlations.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an IDS which has been configured to perform anomaly based event detection, and in particular, intrusion detection, based upon a robust analysis of network traffic vectors derived from granular network packet fields stored in a database. Specifically, the granular network traffic vectors can include scalar values for individual fields in a network packet, such as a network packet which conforms to TCP/IP, UDP/IP, ICMP/IP and the like. Notably, each field can be captured in real-time and stored in a different record in the database so that feature vectors can be constructed from selected combinations of the fields.

Once the feature vectors have been constructed, a multi-variate analysis can be performed upon the feature vectors. For example, one or more self-organizing clustering methodologies can be applied to the feature vectors to produce a set of clusters. Subsequently, a correlative analysis can be performed upon the set of clusters based upon either manually or heuristically chosen metrics, for example the Euclidean or non-Euclidean spherical distance between individual clusters in the set. A deviation between the selected metrics and the individual clusters can indicate anomalous behavior. As a result, the anomalous behavior can be classified as either an event of significance, or a permissible deviation.

Where the anomalous behavior has been classified as an event, the feature vectors which gave rise to the individual clusters associated with the anomalous behavior can be further examined to determine whether an unauthorized network intrusion has occurred. Alternatively, the feature vectors which gave rise to the individual clusters associated with the anomalous behavior can be further examined to determine whether a network condition has arisen, such as the execution of an errant application or a failure in a network device which inhibits the performance of the network or a denial-of-service attack. Importantly, the classification of the anomalous behavior can be provided as feedback to the detection of subsequent anomalous behavior. Thus, over time the detection and classification of anomalous behavior can improve in accuracy as the self-organizing nature of the system adapts to the changing network environment.

Figure 1:
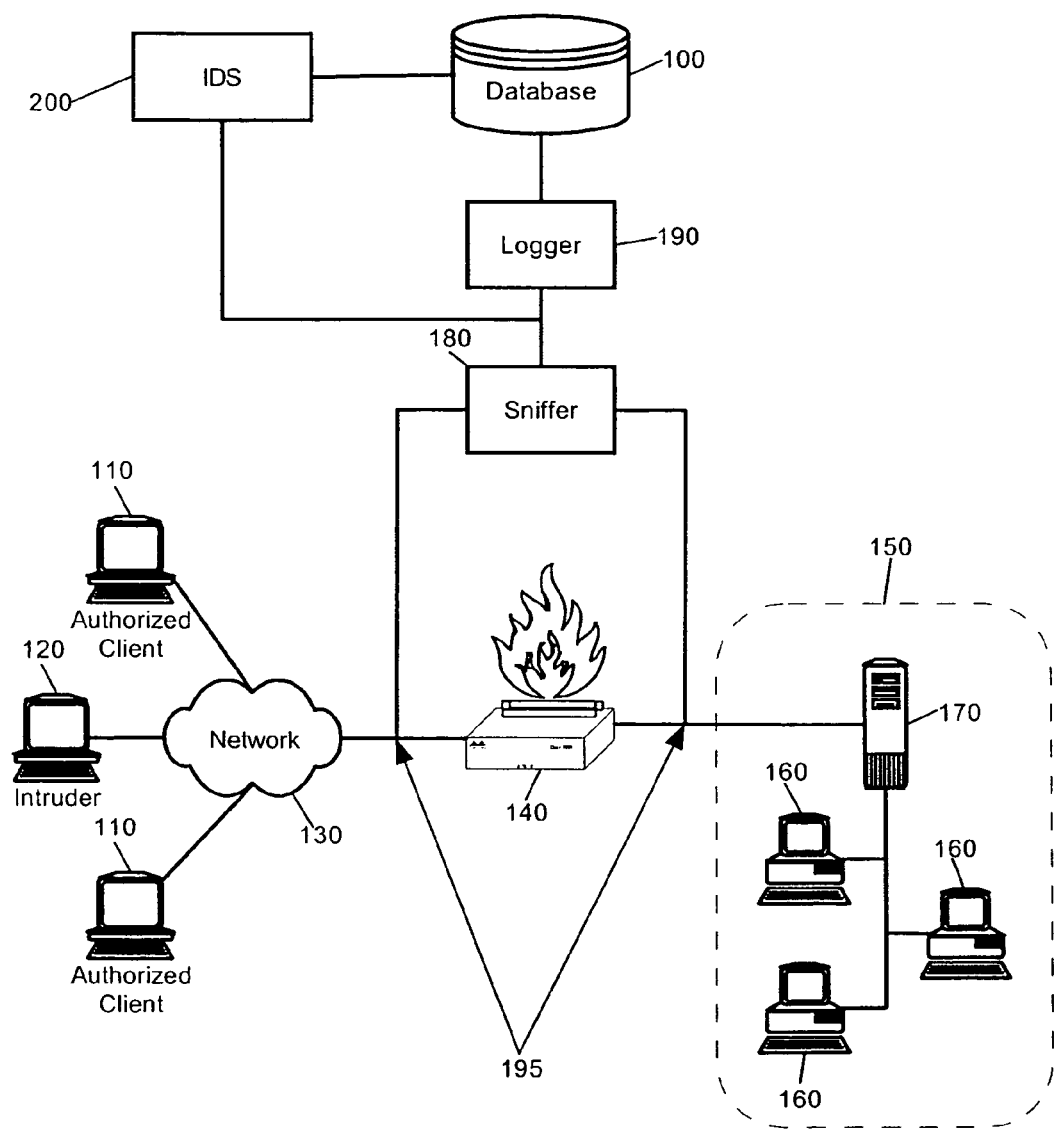
FIG. 1 is a schematic illustration of a private network configured with IDS technology in accordance with the inventive arrangements.

FIG. 1 is a schematic illustration of a private network which has been configured with an IDS in accordance with the inventive arrangements. The private network 150 can include, for example, one or more servers 170 and coupled workstations 160. Authorized client computing devices 110 can access the private network 150 over the computer communications network 130 along a communications path 195 in a conventional manner. In that regard, one or more security appliances 140, such as a firewall, can limit access to the private network 150 in accordance with pre-configured firewall tables (not shown).

The private network 150 shown in FIG. 1 can be subjected to the malicious hacking activities of one or more unauthorized intruders 120 which can attempt to penetrate the restrictions imposed by security appliances 140. To combat the malicious hacking activities, an IDS 200 can be coupled to the communications path 195 between the unauthorized intruder 120 and the target device in the private network 150. Specifically, the IDS 200 can be disposed about the communications path 195 via a portion of the computer communications network 130. In this way, the IDS 200 can monitor network traffic flowing from the unauthorized intruder 120 in order to detect an attack.

To detect an attack, the IDS 200 can monitor and analyze the contents of a database 100 such as a relational database or an object database. The contents can include granular elements of network packets which can be extracted from the network traffic flowing across the communications path 195. More particularly, a packet sniffer 180 can extract network packets from the network traffic either in an exclusive or in an inclusive manner. For instance, the packet sniffer 180 can extract all network packets from the network traffic flowing along the communications path 195. Alternatively, the packet sniffer 180 can extract network packets from the network traffic selectively according to one or more pre-configured selection filters. In any case, a logger 190 can parse the extracted packets along protocol boundaries into the constituent components forming each extracted network packet and can store the constituent components in the database 100.

Importantly, it is to be understood by one skilled in the art that the network topology illustrated in FIG. 1 merely represents an exemplary network topology with which the IDS 200 of the present invention can be explained contextually. In consequence, the skilled artisan will recognize that the IDS 200 of the invention can be adapted for use with other network topologies such as the case where multiple private networks can be monitored by the IDS 200. In the case of multiple private networks, it is to be further understood that each domain within each private network can include one or more server and workstation computing devices, in addition to any number of attached network addressable devices, such as printing devices, routing and switching appliances, security devices, and the like.

Figure 3:
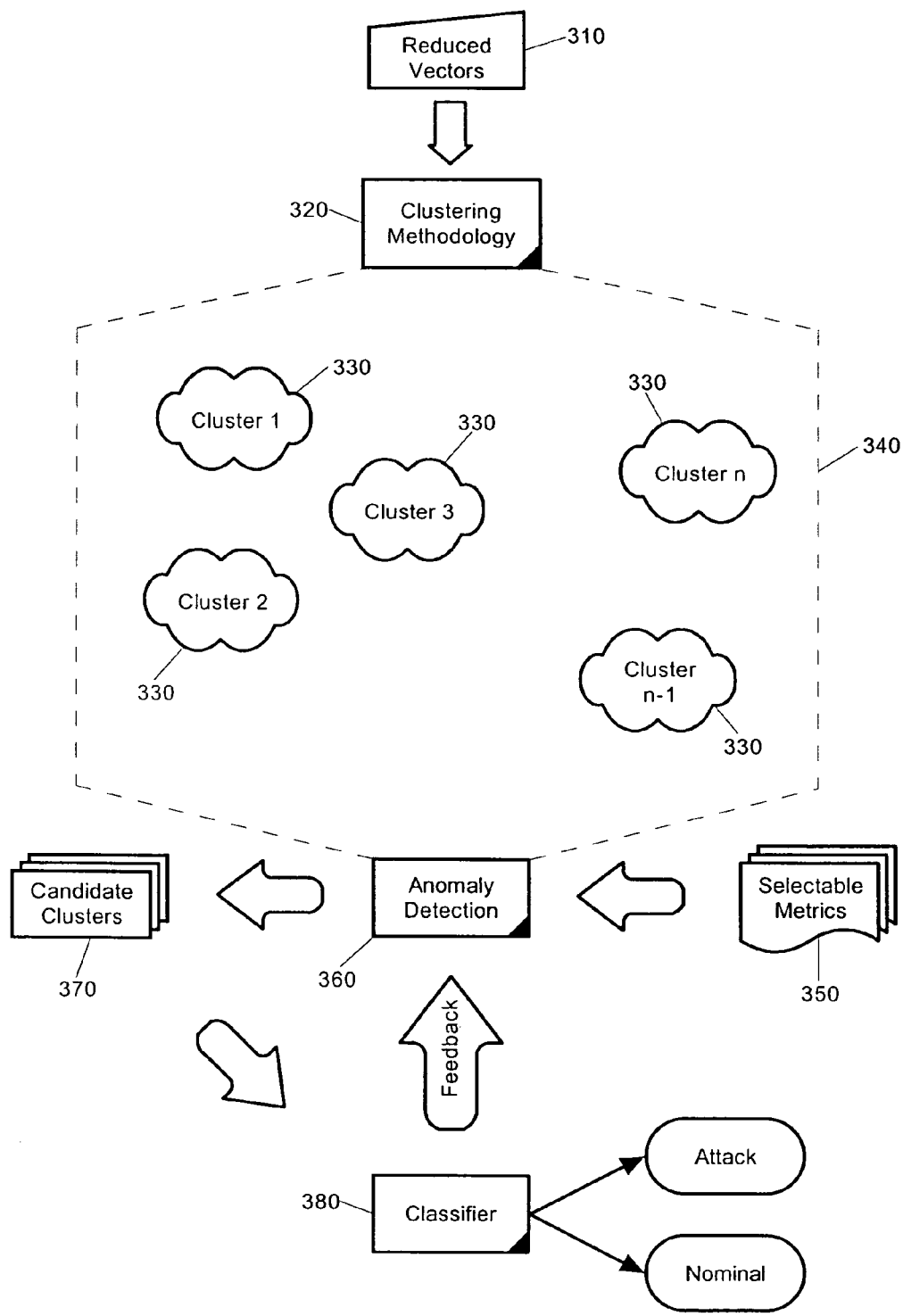
FIG. 3 is a block diagram illustrating a process for detecting and classifying both anomalous and normal behavior among self-organized clusters in an output set produced by the clustering methods of FIG. 2 according to one or more selected metrics; and, FIG. 4 is a schematic illustration of multiple independent private networks coupled to an IDS service provider in accordance with the inventive arrangements.

Significantly, it is a distinct advantage of the IDS 200 of the present invention that the sniffer 180 and logger 190, in concert, can extract and store the constituent components of network packets stemming from network traffic for multiple private networks. In particular, by populating the database 100 with granular packet values from multiple private networks, the IDS 200 can undertake a correlative analysis not only in regard to traffic stemming from a single protected private network 150 such as that illustrated in FIG. 1, but also in regard to traffic stemming from multiple, independently operated private networks 150 as shown in FIG. 3. Accordingly, the IDS 200 can be deployed in the context of a managed service provider (MSP) model. In the MSP model, however, wide-scale network anomalies, including multi-domain attacks, can be detected inasmuch as anomalous behavior can be detected across multiple networks which heretofore would not be possible in reference to conventional IDS technology.

Figure 2:
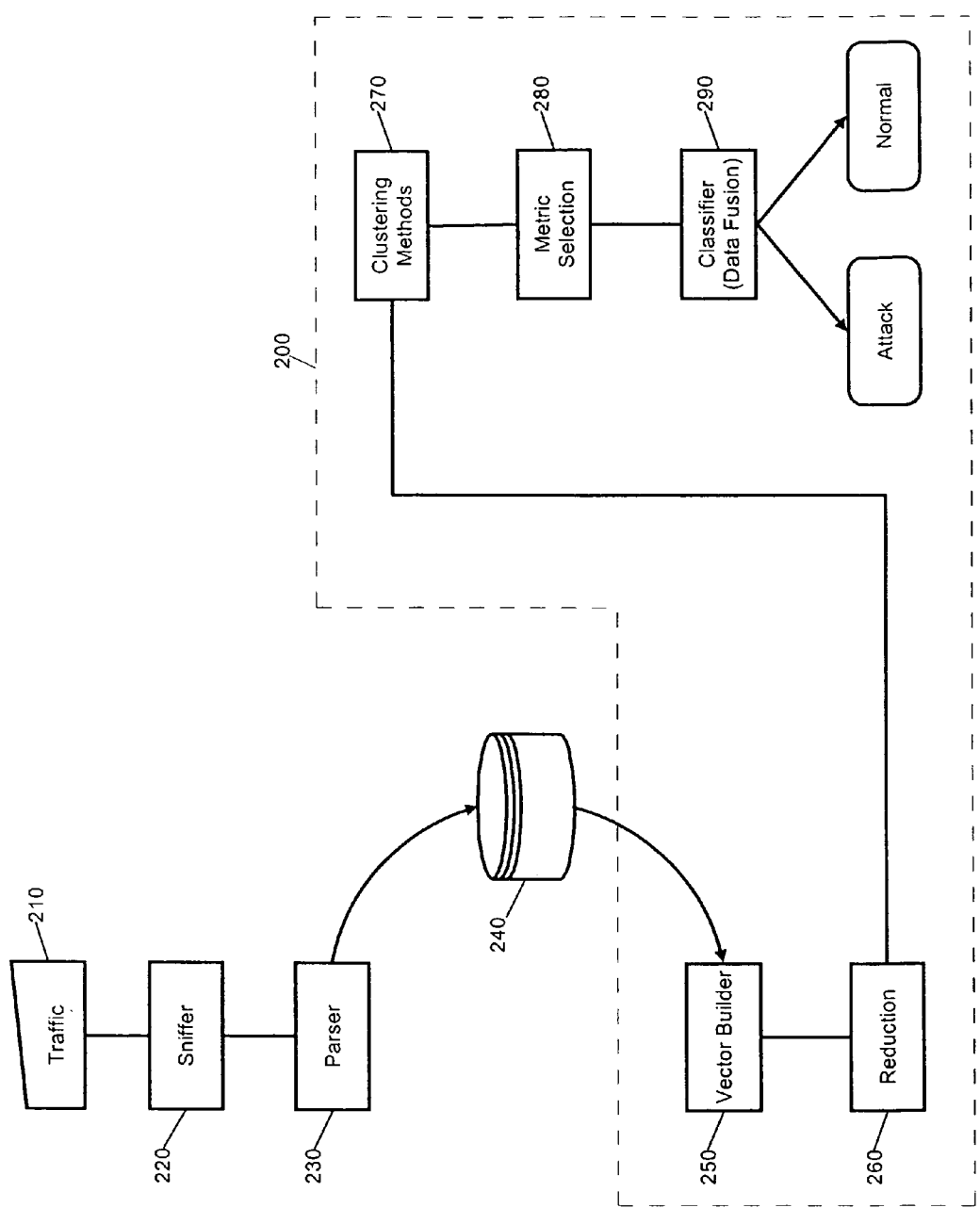
FIG. 2 is a flow chart illustrating a process for performing intrusion detection using the IDS technology of FIG. 1.

FIG. 2 is a flow chart illustrating a process for performing intrusion detection using the IDS 200 of FIG. 1. Beginning in block 220, a packet sniffer can extract network traffic 210 flowing across a communications path coupled to the IDS of the present invention. The network traffic 210 can be extracted exclusively or inclusively according to pre-configured filter rules applied to the packet sniffer. Packet sniffers are well-known in the art and include, for instance, the open-source Snort™ tool able to extract and log whole network packets as the network packets flow across a network interface device communicatively linked to the Snort™ software tool. Still, the invention is not limited in regard to the particular sniffer employed and other packet sniffing tools can suffice, for example Sniffer™ and Sniffer Basic™ manufactured by Network Associates, Inc. of Santa Clara, Calif., United States, Etherpeek™ manufactured by Wildpackets, Inc. of Walnut Creek, Calif., United States, and OptiView Integrated Network Analyzer Pro Gigabit™, manufactured by Fluke Networks of Everett, Wash., United States.

In any case, a sniffer either can be extended or wholly configured to parse extracted network packets into their constituent components. In that regard, a parser 230 can de-construct the network packets along known protocol field boundaries, such as destination and source IP address, time-to-live, payload size, packet type, type of service, etc. Subsequently, selected ones of the de-constructed fields can be stored in separate records in the database 240 and can be associated with the particular socket to which the packet belongs. Optionally, where the IDS has been deployed in an MSP environment, each field can be stored in a record in the database along with a reference to an associated customer and target device in the customer's private network.

In block 250, a vector builder in a feature extraction process can select individual ones of the network packet fields to be included in the construction of a multi-dimensional vector. Additionally, global fields can be included in the construction of the multi-dimensional vectors, such as a customer identifier, or device identifier. Notably, the feature extraction process is not limited strictly to the construction of a multi-dimensional vector using the scalar values of selected fields. Rather, it can be helpful to include in the feature vector programmatically determined scalar values such as histogram data for particular scalar fields of the network packet such as frequency data for a specific field.

In any case, in block 250, multi-dimensional vectors can be constructed using the chosen features produced in block 250. Specifically, the vector builder can process the records in the database 240 to identify pertinent fields associated with a particular "conversation" or socket. As the vector builder locates the pertinent fields, a multi-dimensional vector for that socket can be constructed. Likewise, for other ones of the network data corresponding to other "conversations" or sockets, other multi-dimensional vectors can be constructed until a set of multi-dimensional vectors has been assembled for at least a selection of the granular network packet data associated with particular sockets represented in the database 240.

In block 260, a vector separation system can reduce the dimensionality of the multi-dimensional vectors in order to simplify a subsequent multi-variate analysis. In particular, components of the multi-dimensional vectors which appear to be redundant, irrelevant, or otherwise insignificant relative to other interested components can be eliminated across all or a selection of the multi-dimensional vectors. For instance, a well-known principal component analysis can be applied to the multi-dimensional vectors in order to facilitate the reduction of the multi-dimensional vectors. In consequence, a set of reduced vectors can be produced.

In block 270, one or more self-organizing clustering methodologies can be applied concurrently or sequentially to the set of reduced vectors. Clustering methodologies are known in the art and include, for example, Kohonen self-organizing map (SOM) analysis, principal component analysis, multi-dimensional scaling analysis, principal curve analysis, wavelet analysis, and neural network analysis, among others. Once, the reduced vectors have been processed by the multiple clustering methodologies in block 270, one or more metrics can be selected in block 280 for purposes of establishing a correlation between the output sets of the processed reduced multi-dimensional vectors. The chosen metric can be selected manually or in an heuristic fashion. In either case, in block 290 a classifier can identify from any established correlations whether an anomaly has been detected. For instance, the correlative output can be processed in a neural net or through a decision tree. In any case, the classification process of block 290 can identify either normal traffic or an attack.

FIG. 3 is a block diagram illustrating a process for detecting and classifying anomalous behavior among self-organized clusters in an output set produced by the clustering methods of FIG. 2 according to one or more selected metrics. As shown in FIG. 3, a set of reduced vectors 310 can be processed by one or more clustering methodologies 320. As is well-known in the art of multi-variate analysis, each self-organizing clustering methodology 320 can produce a self-organized mapping 340 of clusters 330. Based upon selected metrics 350, correlations can be evaluated to identify anomalous conditions through the application of an anomaly detection process 360. Though, any suitable metric can suffice, notable examples include a specified Euclidean distance between individual ones of the clusters 330, a specified surface area or volume of space between clusters 330, or a non-Euclidean specified spherical distance between clusters 330.

In any case, by detecting correlations which violate the selected metrics 350, the anomaly detection process 360 can produce a set of candidate clusters 370 which may or may not indicate a network fault or a network intrusion. Rather, the candidate cluster 370 merely indicate that an anomaly has been detected based upon a deviation in an ordinarily expected correlation between clusters 330 in the set as defined by one or more selected metrics 350. By comparison, the classifier 380 can assist in the identification of an actual network fault, a network intrusion or a change in network performance.

In that regard, the classifier 380 can programmatically identify a network fault, a change in network performance, or a network attack according to pre-specified rules, such as whether the deviation of the correlation between clusters 330 exceeds a threshold value. Alternatively, the classifier 380 can provide a manual mechanism for an operator to determine whether an attack or fault has occurred, or whether the anomalous behavior should be accepted at that time and going forward as normal behavior. In either case, the classifier 380, in addition to the anomaly detection process 360 can benefit from the classification of anomalous behavior exemplified among the candidate clusters 370 through the use of constructive feedback.

Figure 4:
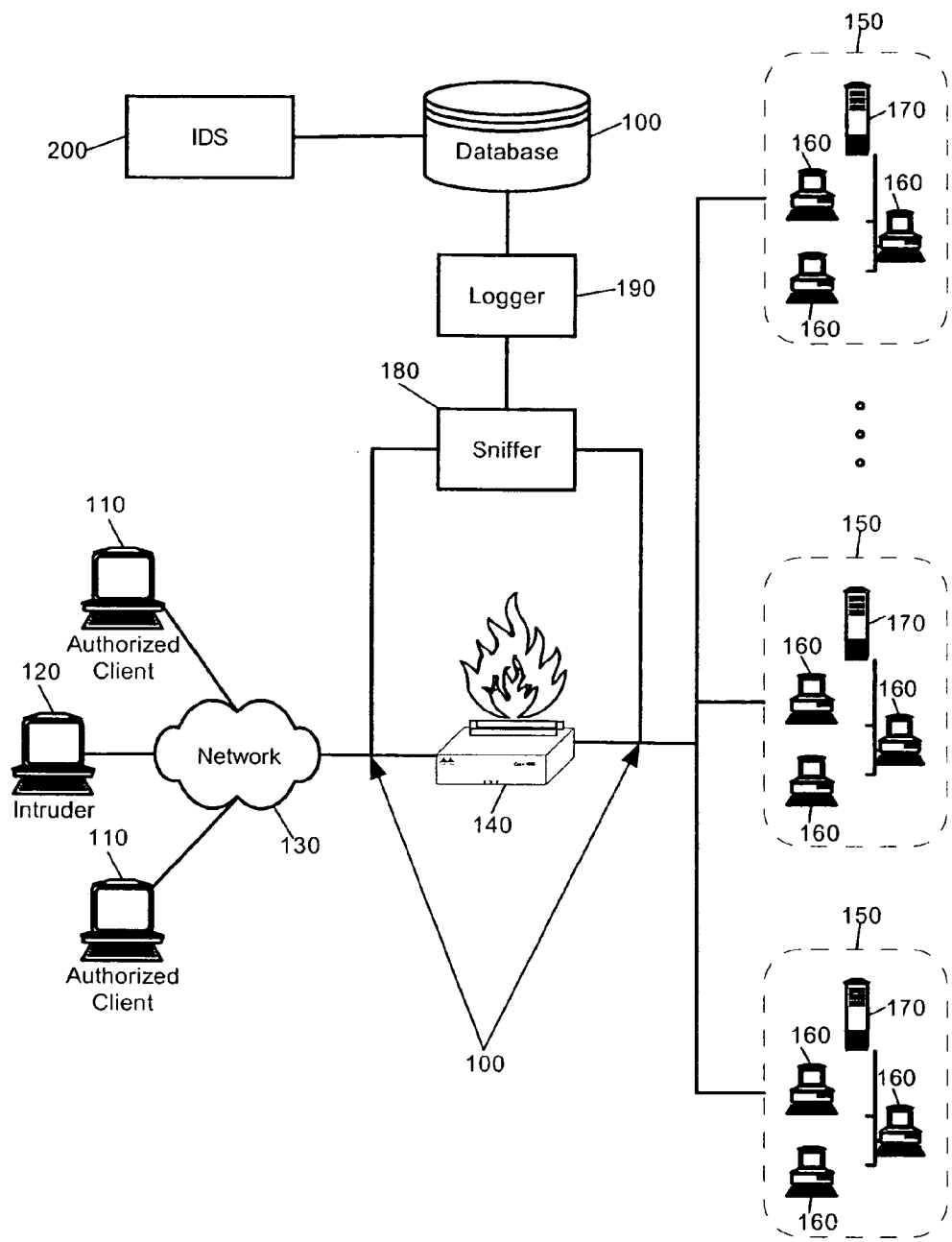

By reference both to FIGS. 3 and 4, one skilled in the art will recognize that by applying the correlative analysis to clusters derived from reduced vectors constructed from data destined for multiple domains among multiple private networks, attacks and network faults can be identified which would not be identifiable through the use of pattern matching techniques associated with conventional signature based systems. Moreover, as the database of the present invention includes packet data derived from multiple network sources, anomalous behavior can be detected across multiple domains which can permit the further identification of otherwise undetectable attacks and network faults. Finally, the use of a database to store multi-domain packet data permits rich querying of the database content so that the necessary correlations can be computed, even across multiple network domains.

The IDS of the present invention can be realized in hardware, software, or a combination of hardware and software. An implementation of an IDS and an intrusion detection method of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

The invention claimed is:

1. An intrusion detection system (IDS) comprising:
   a traffic sniffer executing in a computing system for extracting network packets from passing network traffic;
   a traffic parser executing in a computing system configured to extract individual data from defined packet fields of said network packets;
   a traffic logger executing in a computing system configured to store individual packet fields of said network packets in a database;
   a vector builder executing in a computing system configured to generate multi-dimensional vectors from selected features of said stored packet fields;
   at least one self-organizing clustering module executing in a computing system configured to process said multi-dimensional vectors to produce a self-organized map of clusters;
   an anomaly detector executing in a computing system able to detect anomalous correlations between individual ones of said clusters in said self-organized map based upon at least one configurable correlation metric; and a classifier executing in a computing system configured to classify detected anomalous correlations as one of an alarm behavior.

2. IDS of claim 1, wherein said database is a relational database.

3. The IDS of claim 1, wherein said at least one self-organizing clustering module is configured to perform at least one of a Kohenen self-organizing map analysis, a principal component analysis, an multi-dimensional scaling analysis, a principal curve analysis, a wavelet analysis, and a neural network analysis.

4. The IDS of claim 1, wherein said at least one configurable correlation metric is selected from the group consisting of a heuristically determined metric and a manually specified metric.

5. The IDS of claim 1, wherein said at least one configurable correlation metric is a distance metric selected from the group consisting of a Euclidean distance metric and a non-Euclidean distance metric.

6. The IDS of claim 1, wherein said classifier is a weighted classifier configured to weight individual ones of said anomalous correlations according to a corresponding self-organizing clustering module used to produce particular clusters between which said individual ones of said anomalous correlations are detected.

7. An intrusion detection method comprising the steps of:
monitoring network traffic passing across a network communications path;
extracting network packets from said passing traffic;
storing individual components of said network packets in a database;
constructing multi-dimensional vectors from at least two of said stored individual components and applying at least one multi-variate analysis to said constructed multi-dimensional vectors, said at least one multi-variate analysis producing a corresponding output set;
establishing a correlation between individual output sets based upon a selected metric to identify anomalous behavior; and,
classifying said anomalous behavior as an event selected from the group consisting of a network fault, a change in network performance and a network attack.

8. The method of claim 7, wherein said storing step comprises the steps of:
identifying protocol boundaries in each extracted network packet; and,
storing data from each field separated by said identified protocol boundaries in a separate record in said database.

9. The method of claim 8, further comprising the step of storing with each said individual component in said separate record in said database, data associating said individual component with at least one of a corresponding target network device, a corresponding network socket, and a corresponding customer.

10. The method of claim 7, wherein said step of applying at least one multi-variate analysis to said constructed multi-dimensional vectors comprises the steps of:
reducing said constructed multi-dimensional vectors; and,
applying at least one self-organizing clustering methodology to said reduced multi-dimensional vectors, said application of said at least one self-organizing clustering methodology producing a corresponding output set of clusters.

11. The method of claim 10, wherein said establishing step comprises the steps of:
loading at least one selectable metric;
correlating individual ones of said clusters in said output set;
determining whether any of said correlations deviate from said loaded at least one selectable metric; and,
for each one of said correlated clusters in said output set which deviates from said loaded at least one selectable metric, labeling said deviating correlated cluster as exhibiting anomalous behavior.

12. An intrusion detection method comprising the steps of:
monitoring network traffic passing across a network communications path destined for multiple target devices in multiple independent network domains and extracting network packets from said passing traffic;
identifying protocol boundaries in each extracted network packet and storing data from each field separated by said identified protocol boundaries in a database;
associating said data in said database with at least one of a corresponding target device, a target network domain, a target customer, and a target customer sub-net; processing said stored data using at least one self-organizing clustering method to establish correlations between fields of different network packets destined for different ones of said multiple independent network domains; and,
identifying a network attack, a network fault, or a change in network performance based upon said established correlations.

* * * * *

UNITED STATES PATENT AND TRADEMARK OFFICE
CERTIFICATE OF CORRECTION

PATENT NO. : 7,260,846 B2  
APPLICATION NO. : 11/367950  
DATED : August 21, 2007  
INVENTOR(S) : Christopher W. Day Page 1 of 1

It is certified that error appears in the above-identified patent and that said Letters Patent is hereby corrected as shown below:

On the title page of the Patent, item (73) Assignee, please update the location of the assignee to Ashburn instead of Herndon.

On the title page of the Patent, please insert item (60), entitled "Related U.S. Application Data" and under this section, please insert the following sentence: -- This patent is a Divisional of U.S. Application No. 10/208,485, filed July 30, 2002, now U.S. Patent No. 7,017,186, issued on March 21, 2006. --.

In the Specification

At Column 1, Line 2, underneath the title INSTRUSION DETECTION SYSTEM, please insert the heading -- CROSS-REFERENCE TO RELATED APPLICATIONS -- and underneath the heading CROSS-REFERENCE TO RELATED APPLICATIONS, please insert the following sentence: -- This patent is a Divisional of U.S. Application No. 10/208,485, filed July 30, 2002, now U.S. Patent No. 7,017,186, issued on March 21, 2006. --.

Signed and Sealed this  
Twenty-fifth Day of February, 2014

Michelle K. Lee  
*Deputy Director of the United States Patent and Trademark Office*